US009551435B2

(12) United States Patent
Arunasalam et al.

(10) Patent No.: US 9,551,435 B2
(45) Date of Patent: Jan. 24, 2017

(54) METHOD OF PREVENTING CLOGGING IN A MICROVALVE

(71) Applicant: DunAn Microstaq, Inc., Austin, TX (US)

(72) Inventors: Parthiban Arunasalam, Austin, TX (US); Arvind Panduranga Rao, Austin, TX (US); Dhaman Kumar Besarla, Pflugerville, TX (US); Gengxun Kara Gurley, Hutto, TX (US)

(73) Assignee: DunAn Microstaq, Inc., Austin, TX (US)

( * ) Notice: Subject to any disclaimer, the term of this patent is extended or adjusted under 35 U.S.C. 154(b) by 22 days.

(21) Appl. No.: 14/704,505

(22) Filed: May 5, 2015

(65) Prior Publication Data

US 2015/0352604 A1 Dec. 10, 2015

Related U.S. Application Data

(60) Provisional application No. 62/008,195, filed on Jun. 5, 2014.

(51) Int. Cl.
| | | |
|---|---|---|
| F16K 99/00 | (2006.01) | |
| F16K 11/07 | (2006.01) | |
| F16K 31/02 | (2006.01) | |
| B08B 7/02 | (2006.01) | |
| B08B 17/00 | (2006.01) | |

(52) U.S. Cl.
CPC ............. *F16K 99/0003* (2013.01); *B08B 7/02* (2013.01); *B08B 17/00* (2013.01); *F16K 11/0716* (2013.01); *F16K 31/025* (2013.01); *F16K 99/0044* (2013.01); *F16K 2099/009* (2013.01); *F16K 2099/0098* (2013.01); *Y10T 137/043* (2015.04)

(58) Field of Classification Search
CPC .............. F16K 99/0003; F16K 99/0044; F16K 11/0716; F16K 31/025; F16K 2099/0098; F16K 2099/009; B08B 17/00; B08B 7/00; B08B 7/02; Y10T 137/043
USPC ...................... 137/15.01, 15.04, 15.05, 15.06
See application file for complete search history.

(56) References Cited

U.S. PATENT DOCUMENTS

| | | | | |
|---|---|---|---|---|
| 3,409,470 | A * | 11/1968 | Karpovich | ........ B01F 15/00025 134/1 |
| 8,136,616 | B2 | 3/2012 | Padilla et al. | |
| 9,140,613 | B2 | 9/2015 | Arunasalam et al. | |
| 2006/0243331 | A1* | 11/2006 | Fuller | ................. F04B 27/1804 137/596.16 |
| 2008/0042084 | A1* | 2/2008 | Fuller | ................. F16K 99/0001 251/26 |
| 2010/0012195 | A1* | 1/2010 | Hunnicutt | ........... F16K 99/0001 137/1 |
| 2015/0047345 | A1 | 2/2015 | Eves et al. | |

* cited by examiner

*Primary Examiner* — William McCallister
*Assistant Examiner* — Ian Paquette
(74) *Attorney, Agent, or Firm* — MacMillan, Sobanski & Todd, LLC

(57) ABSTRACT

A method of cleaning contaminants, including particulate contaminants, from a valve in a fluid system includes moving a valve flow control element of the valve from a first position to a second position in response to a change in a condition in the fluid system other than a change in superheat.

20 Claims, 11 Drawing Sheets

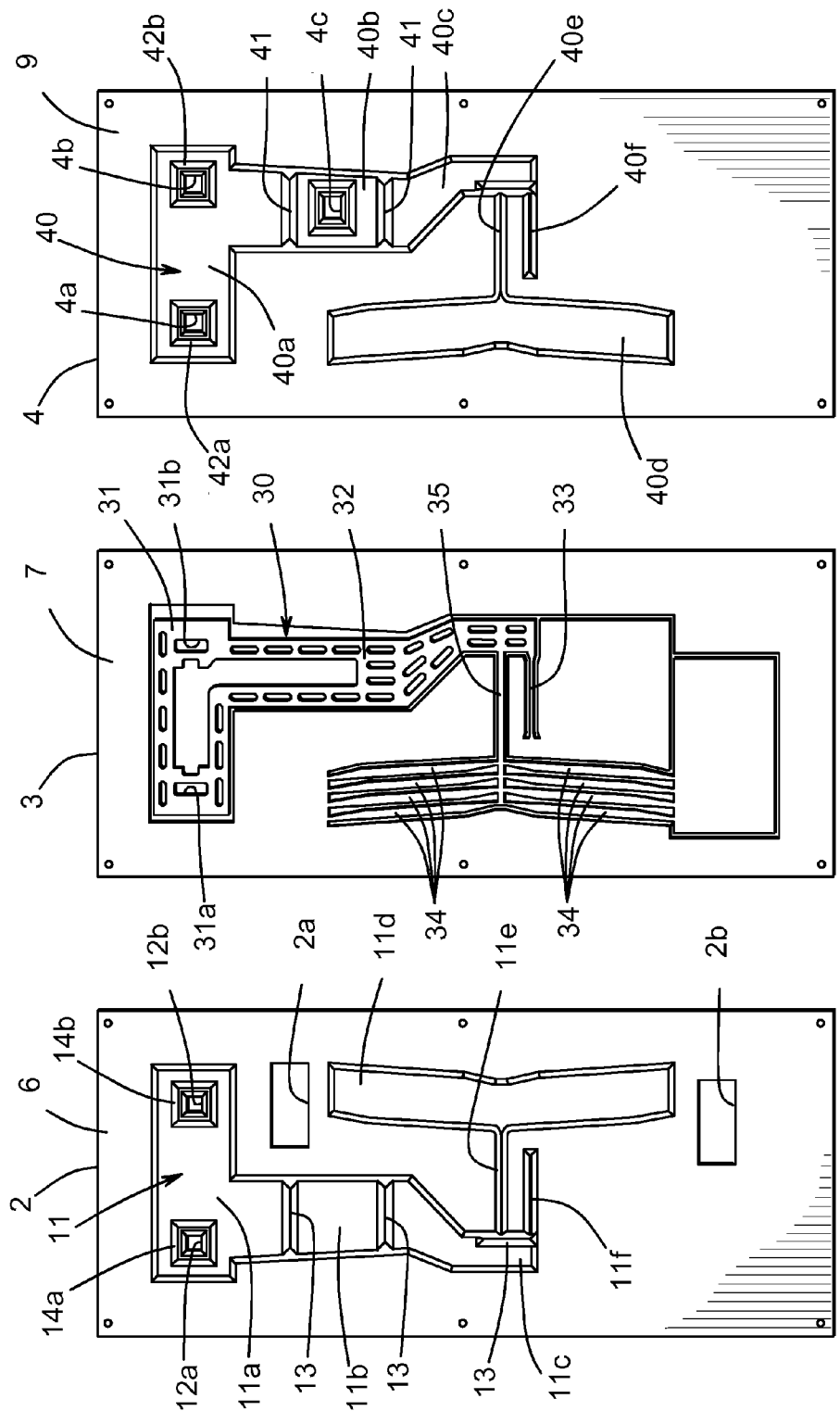

US 9,551,435 B2

METHOD OF PREVENTING CLOGGING IN A MICROVALVE

CROSS REFERENCE TO RELATED APPLICATIONS

This application claims the benefit of U.S. Provisional Application No. 62/008,195 filed Jun. 5, 2014, the disclosure of which is incorporated herein by reference.

BACKGROUND OF THE INVENTION

This invention relates in general to microvalves for controlling the flow of fluid through a fluid circuit. In particular, this invention relates to an improved method of cleaning and preventing undesirable clogging by contaminants, including contaminant particles, in such a microvalve. This invention also relates to an improved method of cleaning and preventing undesirable clogging by contaminants, including contaminant particles, in a spool valve.

Generally speaking, a micro-electro-mechanical system is a system that not only includes both electrical and mechanical components, but is additionally physically small, typically including features having sizes that are generally in the range of about ten micrometers or smaller. The term "micro-machining" is commonly understood to relate to the production of three-dimensional structures and moving parts of such micro-electro-mechanical system devices. In the past, micro-electro-mechanical systems used modified integrated circuit (e.g., computer chip) fabrication techniques (such as chemical etching) and materials (such as silicon semiconductor material), which were micro-machined to provide these very small electrical and mechanical components. More recently, however, other micro-machining techniques and materials have become available.

As used herein, the term "micro-machined device" means a device including features having sizes that are generally in the range of about ten micrometers or smaller and, thus, is at least partially formed by micro-machining. As also used herein, the term "microvalve" means a valve including features having sizes that are generally in the range of about ten micrometers or smaller and, thus, is also at least partially formed by micro-machining. Lastly, as used herein, the term "microvalve device" means a micro-machined device that includes a microvalve, but further includes additional components. It should be noted that if components other than a microvalve are included in the microvalve device, these other components may be either micro-machined components or standard-sized (i.e., larger) components. Similarly, a micro-machined device may include both micro-machined components and standard-sized components.

A variety of microvalve structures are known in the art for controlling the flow of fluid through a fluid circuit. One well known microvalve structure includes a displaceable member that is supported within a closed internal cavity provided in a valve body for pivoting or other movement between a closed position and an opened position. When disposed in the closed position, the displaceable member substantially blocks a first fluid port that is otherwise in fluid communication with a second fluid port, thereby preventing fluid from flowing between the first and second fluid ports. When disposed in the opened condition, the displaceable member does not substantially block the first fluid port from fluid communication with the second fluid port, thereby permitting fluid to flow between the first and second fluid ports.

In this conventional microvalve structure, it has been found that in some instances, the fluid ports may become clogged with contaminants, rendering the microvalve at least partially non-functional. Further, it has been found that in some instances, spool valves may become clogged with contaminants, rendering the spool valve at least partially non-functional. Thus, it would be desirable to provide an improved method of cleaning, unclogging, and of preventing undesirable clogging of the fluid ports in a microvalve, and similarly of cleaning, unclogging, and of preventing undesirable clogging of a spool valve.

SUMMARY OF THE INVENTION

This invention relates in general to microvalves for controlling the flow of fluid through a fluid circuit. In particular, this invention relates to an improved method of cleaning and preventing undesirable clogging by contaminant particles in such a microvalve. This invention also relates to an improved method of cleaning and preventing undesirable clogging by contaminant particles in a microvalve configured as a pilot valve in hybrid spool valve, and preventing undesirable clogging by contaminant particles in a spool valve. In one embodiment, a method of cleaning contaminant particles from a valve in a fluid system includes moving a valve flow control element of the valve from a first position to a second position in response to a change in a condition in the fluid system other than a change in superheat.

Various advantages of the invention will become apparent to those skilled in the art from the following detailed description, when read in view of the accompanying drawings.

BRIEF DESCRIPTION OF THE DRAWINGS

FIG. 3 is a plan view of an inner surface of the cover plate illustrated in FIGS. 1 and 2.

FIG. 4 is a plan view of the intermediate plate illustrated in FIGS. 1 and 2.

FIG. 5 is a plan view of an inner surface of the base plate illustrated in FIGS. 1 and 2.

DETAILED DESCRIPTION OF THE INVENTION

Figure 2:
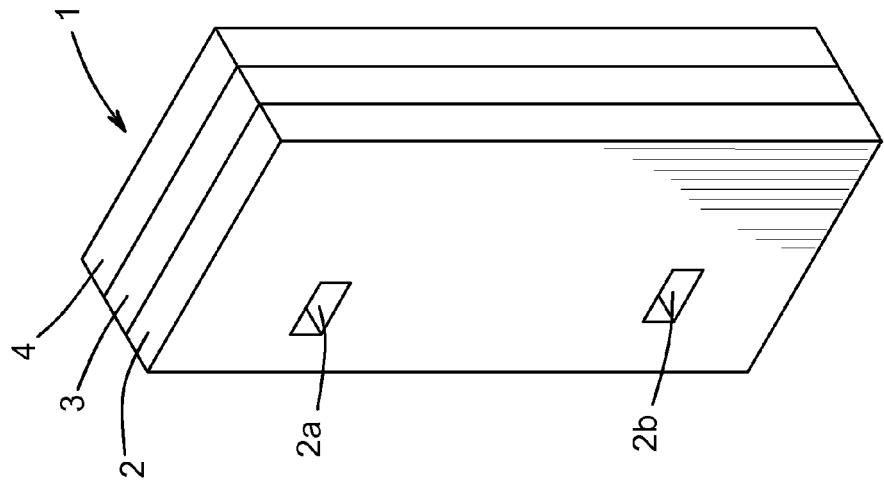
FIG. 2 is a perspective view of the basic structure of the microvalve illustrated in FIG. 1 shown assembled.
Figure 1:
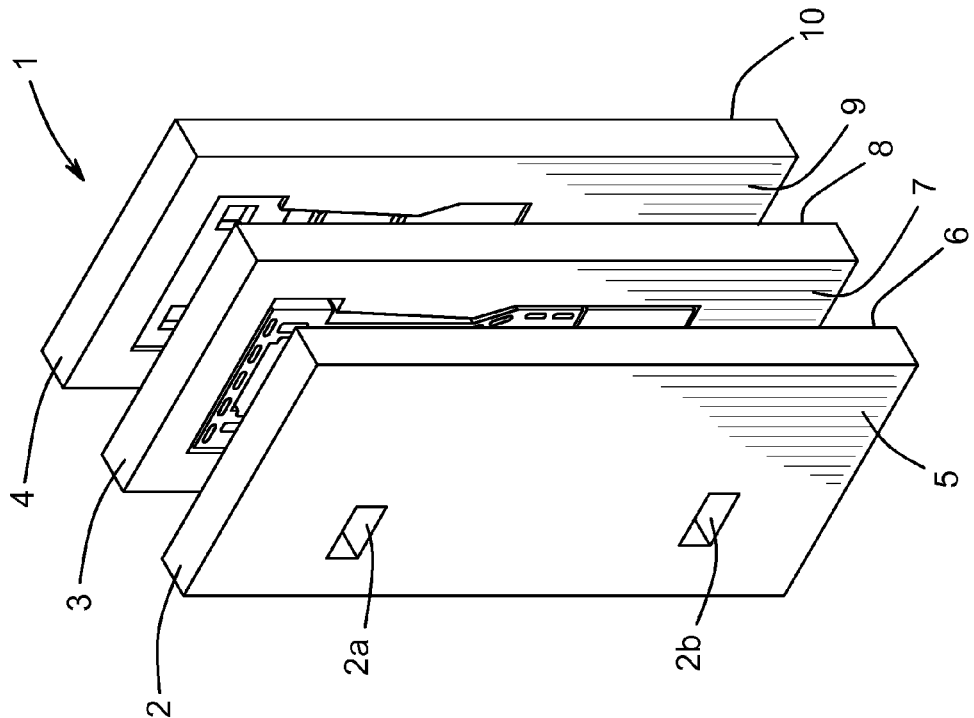
FIG. 1 is an exploded perspective view of a basic structure of a microvalve including a cover plate, an intermediate plate, and a base plate.

Referring now to the drawings, there is illustrated in FIGS. 1 through 8 a basic structure of a conventional microvalve 1. The illustrated microvalve 1 includes a cover plate 2, an intermediate plate 3, and a base plate 4. The cover plate 2 has an outer surface 5 and an inner surface 6. The cover plate 2 also has one or more openings (two of such openings 2a and 2b are shown in the illustrated embodiment) formed therethrough that, in a manner that is well known in the art, allow one or more electrically conductive wires (not shown) to pass therethrough. The intermediate plate 3 has a first surface 7 and a second surface 8. The base plate 4 has an inner surface 9 and an outer surface 10. The base plate 4 also has a one or more openings (three of such openings 4a, 4b, and 4c are shown in the illustrated embodiment) formed therethrough that, in a manner that is well known in the art, allow fluid to flow in to and out of the microvalve 1.

When the microvalve 1 is assembled as shown in FIG. 2, the inner surface 6 of the cover plate 2 engages the first surface 7 of the intermediate plate 3, and the inner surface 9 of the base plate 4 engages the second surface 8 of the intermediate plate 3. The cover plate 2, the intermediate plate 3, and the base plate 4 may be retained in this orientation in any desired manner. For example, portions of the cover plate 2 and/or the base plate 4 may be bonded to the intermediate plate 3, such as by fusion bonding, chemical bonding, or physically bonding (such as, for example, mechanical fasteners and/or adhesives). The cover plate 2, the intermediate plate 3, and the base plate 4 may be composed of any desired material or combination of materials. For example, the cover plate 2, the intermediate plate 3, and the base plate 4 may be composed of silicon and/or similar materials.

Figures 6, 7:
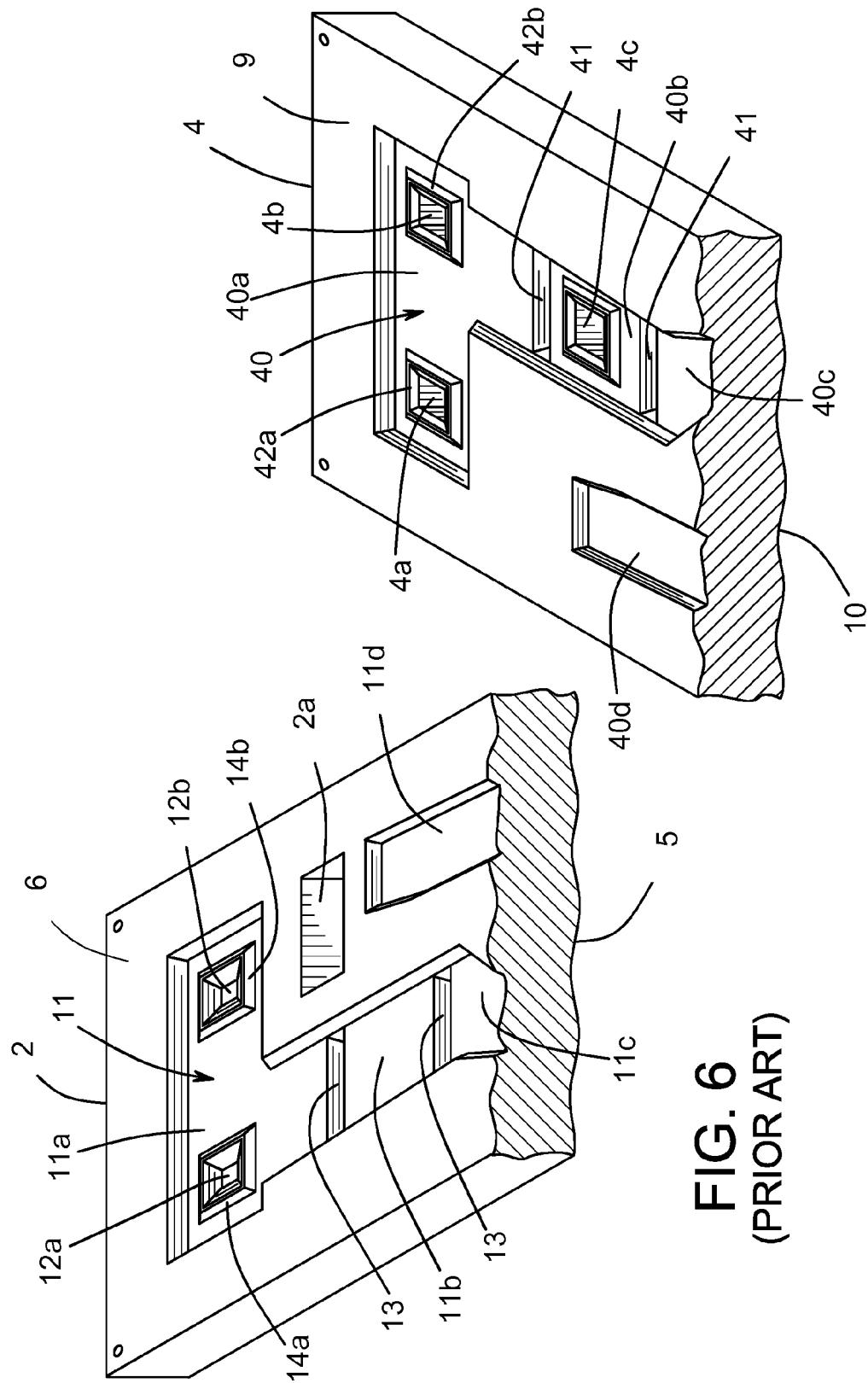
FIG. 6 is a perspective view of a portion of the inner surface of the cover plate illustrated in FIG. 3.
FIG. 7 is a perspective view of a portion of the inner surface of the base plate illustrated in FIG. 5.

The structure of the inner surface 6 of the cover plate 2 for the microvalve 1 is illustrated in detail in FIGS. 3 and 6. As shown therein, the cover plate 2 includes an actuator cavity, indicated generally at 11, that is provided on the inner surface 6 thereof. The illustrated actuator cavity 11 includes an upper actuator arm cavity portion 11a, a central actuator arm cavity portion 11b, a lower actuator arm cavity portion 11c, an actuator rib cavity portion 11d, an actuator spine cavity portion 11e, and an actuator hinge cavity portion 11f. The upper actuator arm cavity portion 11a has a pair of recessed areas 12a and 12b provided therein. The illustrated actuator cavity 11 also has one or more pressure equalization depressions 13 provided therein.

The cover plate 2 has a first sealing structure 14a that extends from the bottom surface of the actuator cavity 11 and completely about the perimeter of the first recessed area 12a. Similarly, the cover plate 2 also has a second sealing structure 14b that extends from the bottom surface of the actuator cavity 11 and completely about the perimeter of the second recessed area 12b. In the illustrated embodiment, each of the sealing structures 14a and 14b is a wall that is generally trapezoidal in cross-sectional shape and includes four linearly-extending wall segments that extend adjacent to the four sides of the recessed areas 12a and 12b. However, the sealing structures 14a and 14b may be formed having any desired cross-sectional shape or combination of shapes, and may further extend in any desired manner (linearly or otherwise) about the recessed areas 12a and 12b. For example, the sealing structures 14a and 14b may be formed substantially as shown in FIGS. 3 and 6, but may have rounded corners between adjacent linearly-extending wall segments, have one or more non-linearly-extending wall segments, or be entirely non-linear in shape. The purpose for the sealing structures 14a and 14b will be explained below.

The structure of the first surface 7 of the intermediate plate 3 for the microvalve 1 is illustrated in detail in FIG. 4. As shown therein, the conventional intermediate plate 3 includes a movable valve member or displaceable member, indicated generally at 30, that includes a sealing portion 31 having a pair of openings 31a and 31b formed therethrough. The sealing portion 31 is connected through an elongated arm portion 32 to a hinge portion 33 that is formed integrally with the conventional intermediate plate 3. The intermediate plate 3 also includes an actuator including a plurality of actuator ribs 34 that is connected through a central spine 35 to the elongated arm portion 32 at a location that is intermediate of the sealing portion 31 and the hinge portion 33.

As shown in FIG. 4, first ends of a first portion of the plurality of actuator ribs 34 (the upper ribs 34 when viewing FIG. 4) are flexibly joined at first ends thereof to a first non-moving part of the intermediate plate 3. Second ends of the first portion of the plurality of actuator ribs 34 are connected to the central spine 35. The first non-moving part of the intermediate plate 3 is electrically connected to a first bond pad (not shown) that is provided on the intermediate plate 3. Similarly, first ends of a second portion of the plurality of actuator ribs 34 (the lower ribs 34 when viewing FIG. 4) are flexibly joined at first ends thereof to a second non-moving part of the intermediate plate 3. Second ends of the second portion of the plurality of actuator ribs 34 are also connected to the central spine 35. The second non-moving part of the intermediate plate 3 is electrically connected to a second bond pad (not shown) that is provided on the intermediate plate 3. The second bond pad is electrically isolated from the first bond pad, other than through the plurality of actuator ribs 34.

In a manner that is well known in the art, electrical current may be passed from the first bond pad through the plurality of actuator ribs 34 to the second bond pad. Such electrical current causes thermal expansion of the plurality of actuator ribs 34, which causes axial movement of the central spine 35. As described above, the central spine 35 is connected to the elongated arm portion 32. Consequently, axial movement of the central spine 35 causes the elongated arm portion 32 (and, therefore, the sealing portion 31) of the displaceable member 30 to pivot about the hinge portion 33 or otherwise move relative to the rest of the intermediate plate 3 (such movement occurring within a plane defined by the rest of the intermediate plate 3). Thus, the illustrated displaceable member 30 functions as a conventional microelectro-mechanical system thermal actuator.

The structure of the inner surface 9 of the base plate 4 is illustrated in detail in FIGS. 5 and 7. As shown therein, the base plate 4 includes an actuator cavity, indicated generally at 40, that is provided on the inner surface 9 thereof. The illustrated actuator cavity 40 includes an upper actuator arm cavity portion 40a, a central actuator arm cavity portion 40b, a lower actuator arm cavity portion 40c, an actuator rib cavity portion 40d, an actuator spine cavity portion 40e, and a hinge cavity portion 40f. The illustrated actuator cavity 40 also has one or more pressure equalization depressions 41 provided therein.

The base plate 4 has a first sealing structure 42a that extends from the bottom surface of the actuator cavity 40 and completely about the perimeter of the first opening 4a. Similarly, the base plate 4 also has a second sealing structure 42b that extends from the bottom surface of the actuator cavity 40 and completely about the perimeter of the second opening 4*b*. In the illustrated embodiment, each of the sealing structures 42*a* and 42*b* is a wall that is generally trapezoidal in cross-sectional shape and includes four linearly-extending wall segments that extend adjacent to the openings 4*a* and 4*b*. However, the sealing structures 42*a* and 42*b* may be formed having any desired cross-sectional shape or combination of shapes, and may further extend in any desired manner (linearly or otherwise) about the openings 4*a* and 4*b*. For example, the sealing structures 42*a* and 42*b* may have rounded corners between adjacent linearly-extending wall segments, have one or more non-linearly-extending wall segments, or be entirely non-linear in shape. The purpose for the sealing structures 42*a* and 42*b* will be explained below.

Figure 8:
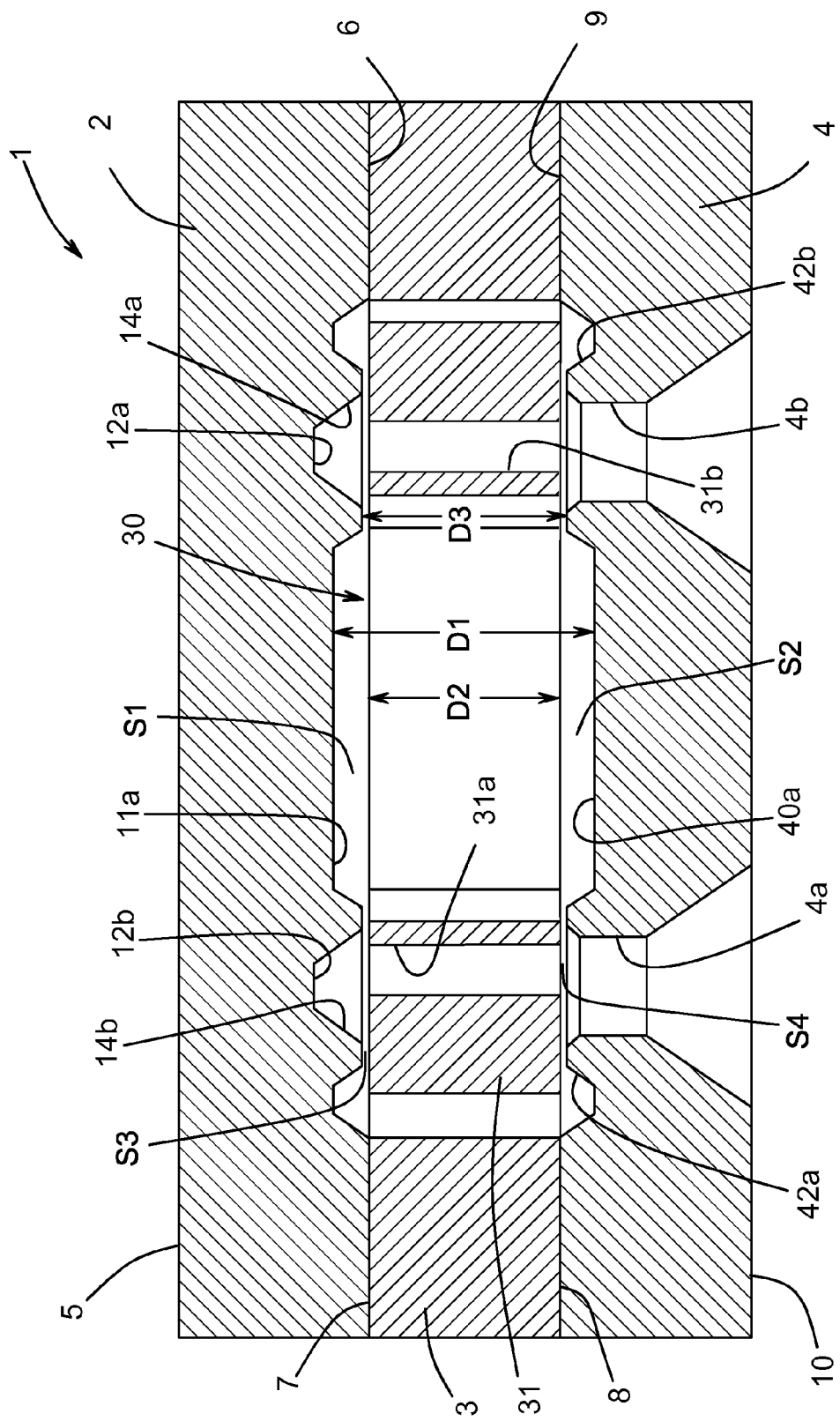
FIG. 8 is a sectional elevational view of the cover plate, the intermediate plate, and the base plate illustrated in FIGS. 3 through 7 shown assembled.

FIG. 8 illustrates the structure of the assembled conventional microvalve 1 shown in FIGS. 3 through 7. As shown therein, non-recessed portions of the inner surface 6 of the cover plate 2 engage corresponding non-recessed portions of the first surface 7 of the intermediate plate 3. Similarly, non-recessed portions of the inner surface 9 of the base plate 4 engage corresponding non-recessed portions of the second surface 8 of the intermediate plate 3. The upper actuator arm cavity portion 11*a* provided on the cover plate 2, the intermediate plate 3, and the upper actuator arm cavity portion 40*a* provided on the base plate 4 all cooperate to define a closed internal cavity in which the sealing portion 31 of the displaceable member 30 is disposed for relative pivoting movement (movement to the left and to the right when viewing FIG. 8).

FIG. 8 illustrates the structure of the assembled microvalve 1 of this invention shown in FIGS. 1 through 7. As shown therein, non-recessed portions of the inner surface 6 of the cover plate 2 engage corresponding non-recessed portions of the first surface 7 of the intermediate plate 3. Similarly, non-recessed portions of the inner surface 9 of the base plate 4 engage corresponding non-recessed portions of the second surface 8 of the intermediate plate 3. The upper actuator arm cavity portion 11*a* provided on the cover plate 2, the intermediate plate 3, and the upper actuator arm cavity portion 40*a* provided on the base plate 4 all cooperate to define a closed internal cavity in which the sealing portion 31 of the displaceable member 30 is disposed for relative pivoting movement (movement to the left and to the right when viewing FIG. 8).

A first thickness D1 for the closed internal cavity is defined between a bottom surface of the upper actuator arm cavity portion 11*a* provided on the cover plate 2 and a bottom surface of the upper actuator arm cavity portion 40*a* provided on the base plate 4 (including the sealing portion 31 of the displaceable member 30 disposed therebetween). That first thickness D1 is significantly larger than a second thickness D2 that is defined by the opposed surfaces of the sealing portion 31 of the displaceable member 30. A third thickness D3 for the closed internal cavity is defined between extended surfaces of the sealing structures 14*a* and 14*b* provided on the cover plate 2 and extended surfaces of the sealing structures 42*a* and 42*b* provided on the base plate 4. Unlike the first thickness D1, that third thickness D3 is only slightly larger than the second thickness D2 that is defined by the opposed surfaces of the sealing portion 31 of the displaceable member 30.

As a result, a first relatively large space S1 is defined between the upper actuator arm cavity portion 11*a* provided on the cover plate 2 and the adjacent surface (the upper surface when viewing FIG. 8) of the displaceable member 30. As shown in FIG. 8, this first relatively large space S1 extends mostly, but not completely, throughout the upper actuator arm cavity portion 11*a* provided on the cover plate 2 and the adjacent (upper) surface of the sealing portion 31 of the displaceable member 30. The thickness of this first relatively large space S1 may be any desired value that is not likely to result in one or more particles (not shown), such as contaminant particles, contained in the fluid leaking through such relatively large space S1 becoming jammed therebetween. For example, the thickness of this first relatively large space S1 may be approximately 50 µm.

As used herein, a micro contaminant particle is a solid or semi-solid particle having a size within the range of from about 1 µm to about 4 µm. However, a micro contaminant particle may also be a solid or semi-solid particle smaller than 1 µm or larger than 4 µm.

Similarly, a second relatively large space S2 is defined between the upper actuator arm cavity portion 40*a* provided on the base plate 4 and the adjacent surface (the lower surface when viewing FIG. 8) of the displaceable member 30. As shown in FIG. 8, this second relatively large space S2 also extends mostly, but not completely, throughout the upper actuator arm cavity portion 40*a* provided on the base plate 4 and the adjacent (lower) surface of the sealing portion 31 of the displaceable member 30. The thickness of this second relatively large space S2 may be any desired value that is not likely to result in one or more particles (not shown) contained in the fluid leaking through such relatively large space S2 becoming jammed therebetween. For example, the thickness of this second relatively large space S2 may also be approximately 50 µm.

As mentioned above, the first and second sealing structures 14*a* and 14*b* extend from the bottom surface of the actuator cavity 11 and completely about the perimeter of the first and second recessed areas 12*a* and 12*b*, respectively. As a result, a first relatively small space S3 is defined between the first and second sealing structures 14*a* and 14*b* and the adjacent surface (the upper surface when viewing FIG. 8) of the displaceable member 30. This first relatively small space S3 extends completely throughout the perimeters of the first and second recessed areas 12*a* and 12*b*. The thickness of this first relatively small space S3 may be any desired value that is not likely to result in excessive leakage, as described above. For example, the thickness of this first relatively small space S3 may be approximately 1 µm to 3 µm.

Similarly, the first and second sealing structures 42*a* and 42*b* extend from the bottom surface of the actuator cavity 40 and completely about the perimeter of the first and second openings 4*a* and 4*b*, respectively. As a result, a second relatively small space S4 is defined between the first and second sealing structures 42*a* and 42*b* and the adjacent surface (the upper surface when viewing FIG. 8) of the displaceable member 30. This second relatively small space S4 extends completely throughout the perimeters of the first and second openings 4*a* and 4*b*. The thickness of this second relatively small space S4 may be any desired value that is not likely to result in excessive leakage, as described above. For example, the thickness of this second relatively small space S4 may be approximately 1 µm to 3 µm.

Figure 9:
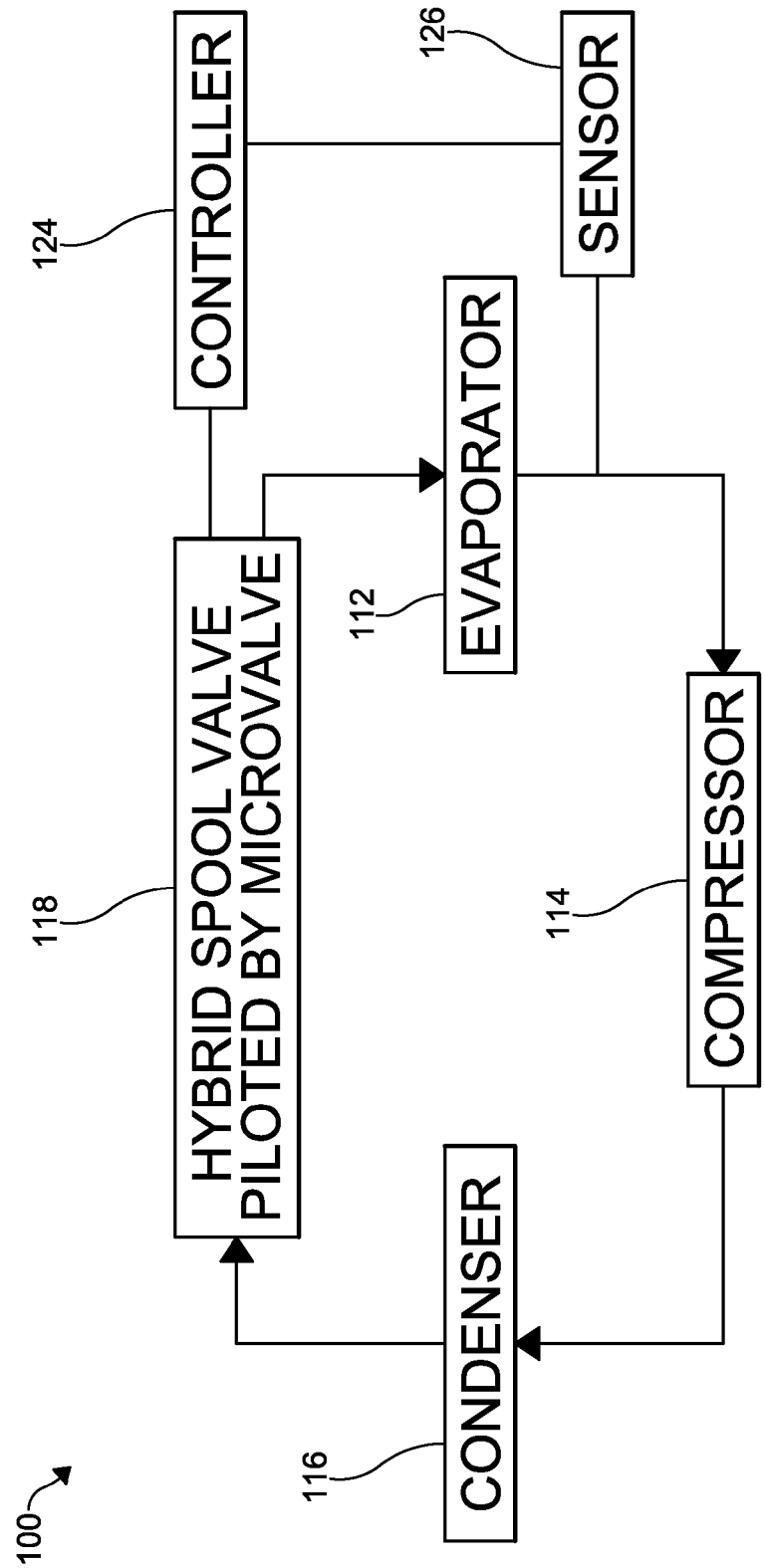
FIG. 9 is a block diagram of an embodiment of a refrigeration system having the improved method according to this invention applied thereto.
Figure 10:
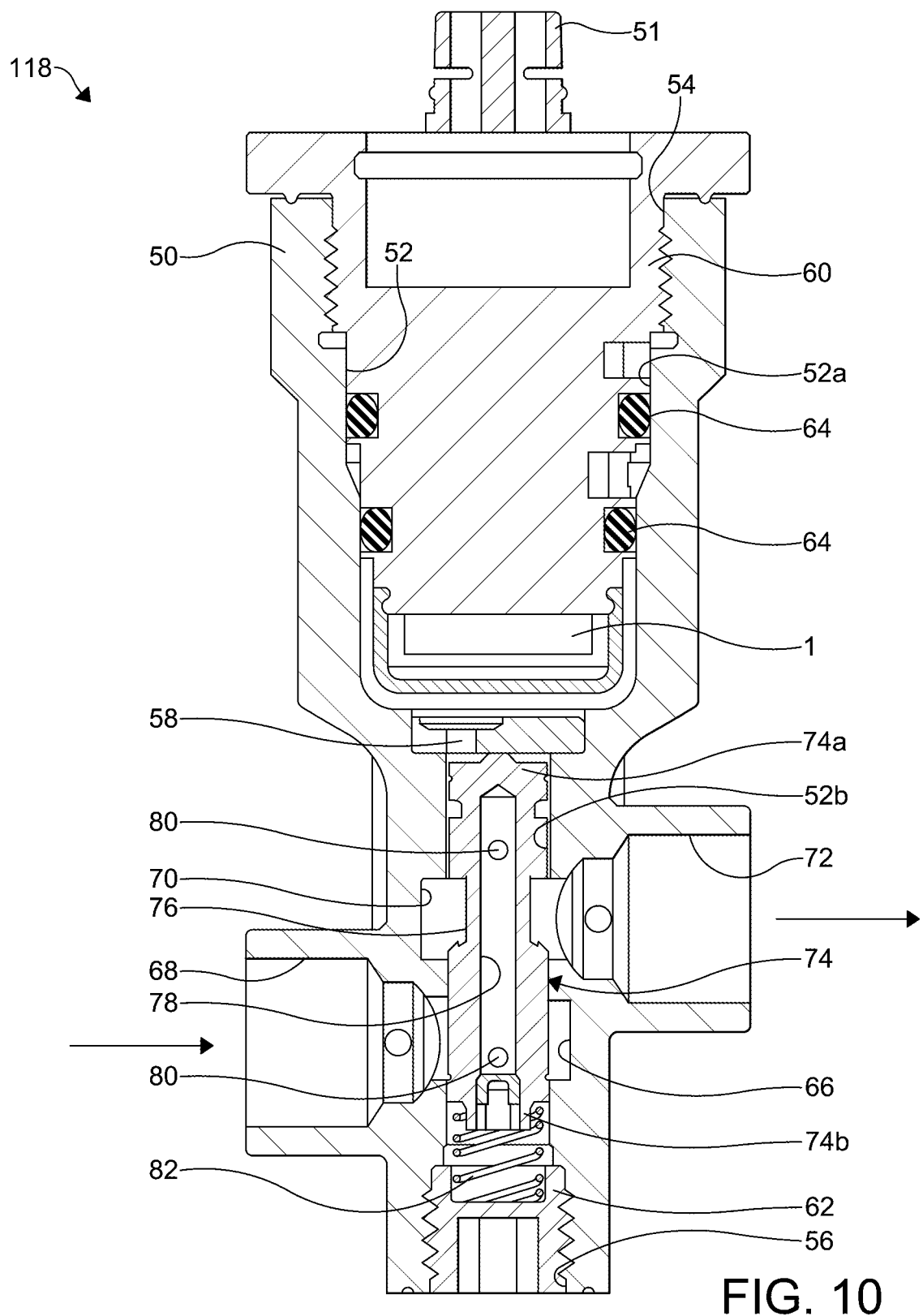
FIG. 10 is a sectional elevational view of one embodiment of the microvalve piloted spool valve illustrated in FIG. 9.

The microvalve 1 may be used as a pilot valve in a hybrid spool valve, such as the hybrid spool valve 118 shown in FIGS. 9 and 10. When used as a pilot valve for example, the opening 4*a* defines a metering valve port or normally open port and the opening 4*b* defines a normally closed port.

Referring now to FIG. 9, there is illustrated a block diagram of a conventional structure for a refrigeration system, indicated generally at 100. The conventional refrigeration system 100 includes an evaporator 112, such as an evaporator coil. The evaporator 112 may be conventional in the art and is configured to receive relatively low pressure liquid refrigerant at an inlet thereof. A relatively warm fluid, such as air, flows over the evaporator 112, causing the relatively low pressure liquid refrigerant flowing in the evaporator 112 to expand, absorb heat from the fluid flowing over the evaporator 112, and evaporate within the evaporator 112. The refrigerant is thus changed from a relatively low pressure liquid at the inlet of the evaporator 112 to a relatively low pressure gas at an outlet of the evaporator 112. The outlet of the evaporator 112 is connected to an inlet of a compressor 114.

The compressor 114 may be conventional in the art and is configured to compress the low pressure gas refrigerant from the evaporator 112 and move the refrigerant through the refrigeration system 100.

Relatively high pressure gas is discharged from an outlet of the compressor 114 to an inlet of a condenser 116. The condenser 116 may be conventional in the art and is configured to remove heat from the relatively high pressure gas as it passes therethrough. As a result, the high pressure gas condenses and becomes a relatively high pressure liquid.

The high pressure liquid then moves from an outlet of the condenser 116 to an expansion device. In the illustrated embodiment, the expansion device is a hybrid spool valve 118 configured to restrict the flow of fluid therethrough and, as a result, the fluid pressure is lowered as the fluid leaves the spool valve 118. The relatively low pressure fluid is then returned to the inlet of the evaporator 112, and the refrigeration cycle is repeated. The refrigeration system 100 may also include a variety of other well known components to facilitate and optimize the process.

A control mechanism, such as a superheat sensor/controller 124 having a processor therein, may be fluidly connected to a fluid or suction line that connects the evaporator 112 and the compressor 114. An external sensor 126 is also attached to the suction line. An electrical signal transmission line (not shown) connects the external sensor 126, the superheat controller 124, and the micro-expansion valve 22. U.S. Pat. No. 9,140,613, the disclosure of which is incorporated herein in its entirety by reference, describes superheat sensors, controllers, and processors, and their operation. The external sensor 126 may be any desired sensor, such as for example, a temperature sensor, a pressure sensor, or a combination temperature and pressure sensor.

Referring now to FIG. 10, the illustrated hybrid spool valve 118 includes a body 50 defining a longitudinally extending bore 52 having a first open end 54 and a second open end 56. The bore 52 includes a first portion 52a and a second portion 52b having a diameter smaller than the first portion 52a. A connecting fluid passageway 58 connects the first portion 52a and the second portion 52b. The first open end 54 may be closed by a suitable first plug 60 and the second open end 56 may be closed by a suitable second plug 62. The plugs 60 and 62 may be sealingly fixed in their respective open ends 54 and 56 by any suitable mechanism, such as welding, press fitting, rolling, or, as illustrated, held in place by a threaded connection, and made leak-tight by on or more seals or O-rings 64. An electrical connector 51 extends outwardly from an outside axial end of the plug 60.

The microvalve 1 is seated within the first portion 52a of the bore 52 between the connecting fluid passageway 58 and the first plug 60.

The second portion 52b of the bore 52 includes a circumferentially extending first groove defining a fluid inlet chamber 66. The fluid inlet chamber 66 is connected to the condenser 116 via an inlet port 68. The second portion 52b of the bore 52 also includes a circumferentially extending second groove defining a fluid outlet chamber 70. The fluid outlet chamber 70 is connected to the evaporator 112 via an outlet port 72.

A movable valve element in the form of a generally cylindrical spool 74 is disposed in the second portion 52b of the longitudinally extending bore 52. The spool 74 has a first end 74a disposed near the connecting fluid passageway 58, and a second end 74b disposed near the second plug 62 at the second open end 56. The spool 74 includes a circumferentially extending fluid flow groove 76 formed in an outer surface thereof. The spool 74 has a longitudinal bore 78 formed therein, extending from an opening in the axial end face of the second end 74b of the spool 74 to a closed end at the first end 74a of the spool 74. One or more radial ports 80 are formed through the spool 74 and provide fluid communication between the longitudinal bore 78 and the second portion 52b of the bore 52. A compression spring 82 may be disposed between the second end 74b of the spool 74 and the second plug 62 at the second open end 56 of the bore 52.

The illustrated spool valve 118 is movable between a closed position, as shown in FIG. 10 and an open position (not shown). In a conventional manner, fluid pressure, created by fluid flowing through the microvalve 1, such as through the opening 4c, and the connecting fluid passageway 58 into the second portion 52b of the bore 52 will urge the spool 74 toward the second open end 56 of the bore 52 (downwardly when viewing FIG. 10) and into the open position wherein the fluid flow groove 76 connects the fluid inlet chamber 66 and the fluid outlet chamber 70, thus allowing fluid to flow between the inlet port 68 and the outlet port 72.

In the illustrated embodiment, the second portion 52b of the bore 52 above the fluid outlet chamber 70, and the portion of the bore between the fluid inlet chamber 66 and the fluid outlet chamber 70 define spool reduced clearance areas. These spool reduced clearance areas may have a clearance of only about 3 micrometers to about 10 micrometers when clean, and may become clogged with the contaminant particles described above, thus degrading the effectiveness of the spool valve 118 such that it is only partially functional, or rendering the spool valve non-functional.

Similarly, in the exemplary microvalve 1, the small spaces S3 and S4 have a thickness of approximately 1 $\mu$m to 3 $\mu$m. This thickness or space of approximately 1 $\mu$m to 3 $\mu$m defines a critical clearance area, such as at the openings 4a and 4b. The openings 4a and 4b may become clogged with the contaminant particles described above, thus degrading the effectiveness of the microvalve 1 such that it is only partially functional, or rendering the microvalve 1 non-functional.

This invention relates to the implementation of methods of cleaning the microvalve 1 and/or the spool valve 118, thus preventing such clogging by the micro contaminant particles. Additionally, the methods described herein may be used to unclog the microvalve 1 and the spool valve 118 if either one becomes clogged by the micro contaminant particles.

When the microvalve 1 is used in the refrigeration system 100 for example, the conditions within, and external to, the refrigeration system 100 may remain substantially unchanged for an extended period of time, such as for several minutes to several hours or more, and the normally open port 4a may remain open and in a fixed position for this extended period of time. The normally closed port 4b may also remain in a fixed position for this extended period of time. When in a fixed position for such an extended period of time, the critical clearance areas at the normally open port 4a and the normally closed port 4b may become clogged with the contaminant particles.

Similarly, when the conditions within, and external to, the refrigeration system 100 remain substantially unchanged for an extended period of time, the hybrid spool valve 118 may remain in a fixed position for this extended period of time. When in a fixed position for such an extended period of time, the spool reduced clearance areas between the spool 74 and the second portion 52b of the bore 52 may become clogged with the micro contaminant particles.

One way to ensure that the contaminant particles do not have an opportunity to undesirably accumulate in the critical clearance areas at the openings 4a and 4b is to implement a clean cycle wherein the sealing portion 31 of the displaceable member 30 is caused to move at a rate fast enough that the refrigeration system 100 does not have time to respond substantially to this movement, and the flow of refrigerant through the refrigeration system 100 remains substantially unchanged by the movement of the displaceable member 30.

In accordance with one aspect of this invention, by causing the sealing portion 31 of the displaceable member 30 of the microvalve 1 to move for a defined period of time, and repeating the period of movement over time, it is possible to prevent clogging of the critical clearance areas and to unclog or clean; i.e., break trapped contaminant particles free from the critical clearance areas in and around the openings 4a and 4b.

As used herein, a clean cycle may be defined as one or more clean cycle steps. Further, a clean cycle step may be defined as moving or cycling of a valve in a fluid system to improve operation of the valve such as by removing the contaminants. The clean cycle step consists of moving a valve flow control element from a first position to at least a second position, such as shown at 224 in FIG. 13. Alternatively, the clean cycle step may consist of moving the valve flow control element from a first position to at least a second position and back to the first position, such as shown at 224' in FIG. 13, or to at least a second position and then to a position intermediate the second and the first positions (not shown), sufficiently quickly that there is no substantial effect on the fluid system during execution of the clean cycle step. Additionally, as used herein, the term cycle rate may be defined as a number of clean cycle steps per unit of time.

The microvalve 1 and the hybrid spool valve 118 may each have one or more clean cycles implemented and controlled by an algorithm in a processor of the controller 124.

The microvalve 1 may be operated through one or more clean cycle steps, wherein the valve flow control element; e.g., the sealing portion 31 of the displaceable member 30, moves from a first position to at least a second position, for a designated period of time relative to an orifice, such as the normally open port 4a or the normally closed port 4b. The movement of the microvalve 1 through the one or more clean cycle steps is preferably executed at a cycle rate that does not substantially affect the overall flow control requirement of the microvalve 1 and prevents the critical clearance areas from becoming clogged by a micro contaminant particle. Thus, the clean cycle may be considered a preventive step to ensure that the critical clearance areas do not become clogged.

In a manner similar to the microvalve 1, the hybrid spool valve 118 may be operated through one or more clean cycle steps, wherein the valve flow control element; e.g., the spool 74, is moved within the second portion 52b of the bore 52 from a first position to at least a second position, for a designated period of time relative to a fluid valve 118 described herein, the one or more clean cycle steps are preferably executed at a cycle rate that does not substantially affect the overall flow control requirement of the hybrid spool valve 118 and ensures that a micro contaminant particle does not cause the spool reduced clearance areas to become clogged. Thus, when applied to the hybrid spool valve 118, the clean cycle may also be considered a preventive step to ensure that the critical clearance areas do not become clogged.

Figure 11:
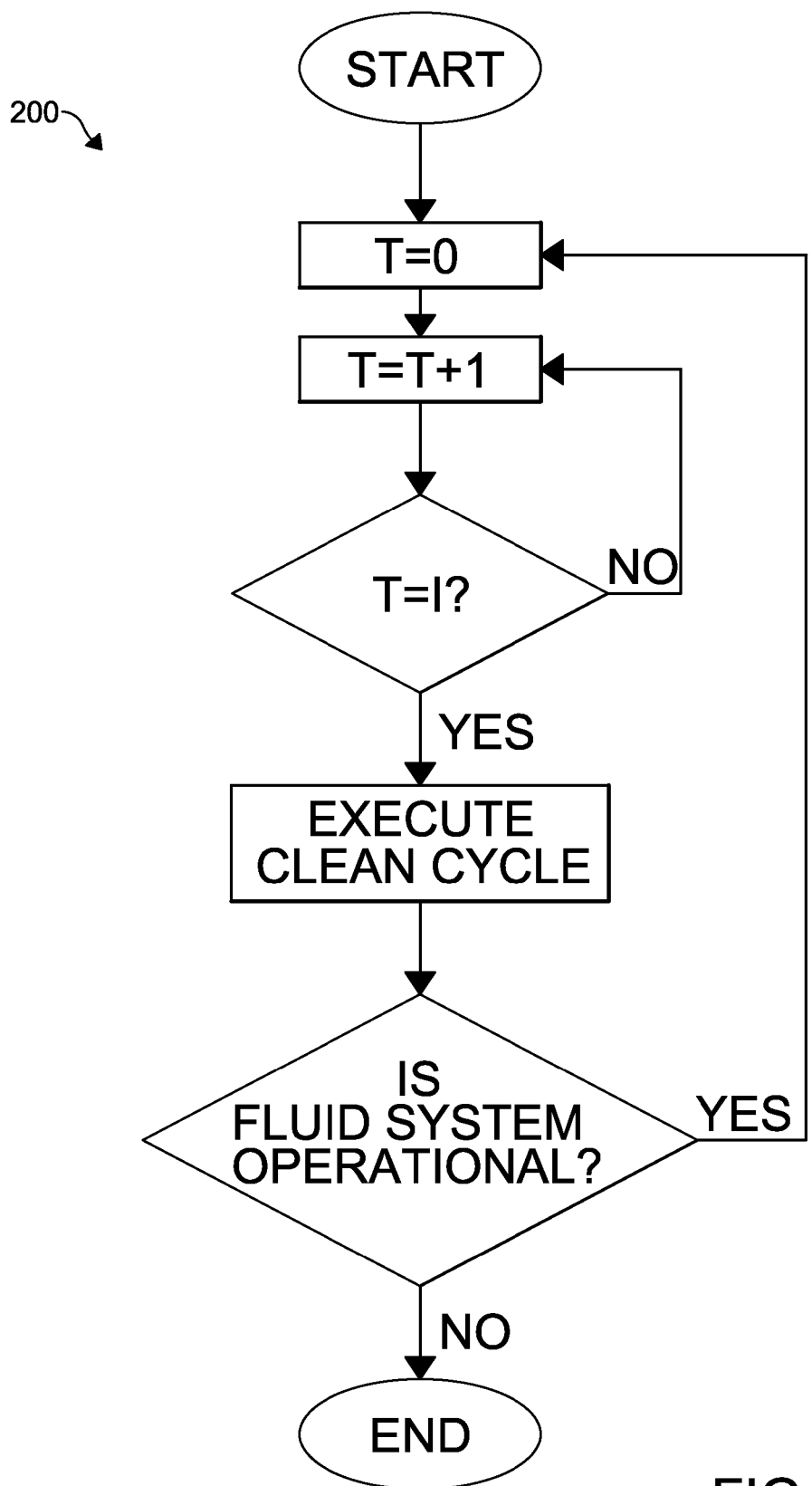
FIG. 11 is a flow chart showing a first embodiment of the improved method according to this invention.

As shown in FIG. 11, a first embodiment of a method of cleaning a valve, and therefore preventing clogging according to the invention, is shown at 200. In FIG. 11, T=time and I=a time interval.

For example, in the first embodiment of the method 200 of cleaning a valve, a clean cycle may be initiated at anytime during operation of the microvalve 1, the spool valve 118, or the refrigeration system 100. The sealing portion 31 of the displaceable member 30 of the microvalve 1, or the spool 74 of the hybrid spool valve 118, may be moved at a designated cycle rate; i.e., a designated number of clean cycle steps per unit of time, repeated at a time interval I. The first embodiment of the method 200 of cleaning a valve may continue as long as the fluid system, such as the refrigeration system 100, within which the microvalve 1 and/or the hybrid spool valve 118 is an operational component, is operational.

During operation of the microvalve 1 for example, the time T is measured at designated increments, such as one second increments, until the time T equals the time interval I. Upon reaching the time interval I, the clean cycle of the method 200 of cleaning a valve is executed at a predetermined cycle rate. If after completion of the clean cycle, the refrigeration system 100 remains operational, then the timer count is reset to zero, and the timer starts again. The first embodiment of the method 200 of cleaning a valve will continue at its designated cycle rate and time interval I. If the refrigeration system 100 ceases to operate, the first embodiment of the method 200 of cleaning a valve ends.

In one example of the first embodiment of the method 200 of cleaning a valve, the sealing portion 31 of the displaceable member 30 of the microvalve 1 may be moved at a cycle rate of 12 clean cycle steps per second at a time interval I of one second every minute. In an exemplary first embodiment of the method 200 of cleaning a valve, the cycle rate is executed at the fastest rate that the sealing portion 31 of the displaceable member 30 can move through a designated number of clean cycle steps without compromising the overall flow requirements of the microvalve 1, i.e., without substantially changing the overall flow through the microvalve 1, and at the same time slow enough to ensure micro contaminant particles do not clog the critical clearance areas.

Alternatively, other cycle rates and other time intervals I may be used. For example, the sealing portion 31 of the displaceable member 30 of the microvalve 1 may be moved at a cycle rate within the range of about twelve to about twenty-four clean cycle steps per second at a time interval I having any desired duration repeating at any desired time interval.

Implementing the first embodiment of the method 200 of cleaning a valve can prevent clogging by micro contaminant particles at the openings 4a and 4b. It has been further shown that the effect of the first embodiment of the method 200 of cleaning a valve on the function of the microvalve 1, the hybrid spool valve 118, and on overall superheat control of the hybrid spool valve 118 piloted by the microvalve 1 is negligible, except for an improvement in the degree of control. For example, in a refrigeration system 100 with a target superheat of 10° F., and with the microvalve 1 being hampered in operation by the presence of micro contaminant particles, control of the amount of superheat may be impaired, causing superheat to vary by 1.8° F. or more. Implementation of the first embodiment of the method 200 of cleaning a valve was shown to improve control of the superheat in the refrigeration system 100 such that it will vary from any desired target superheat, such as the target superheat of 10° F., only within the range of about +/−1° F.

The first embodiment of a method 200 of cleaning a valve may also be applied to the hybrid spool valve 118. As the spool 74 moves through the clean cycle step within the second portion of the bore 52b, any micro contaminant particles that are trapped between the spool 74 and second portion of the bore 52b, are broken free and moved into the fluid inlet chamber 66 and the fluid outlet chamber 70, and eventually out of the spool valve 118 through the outlet port 72.

Figure 12:
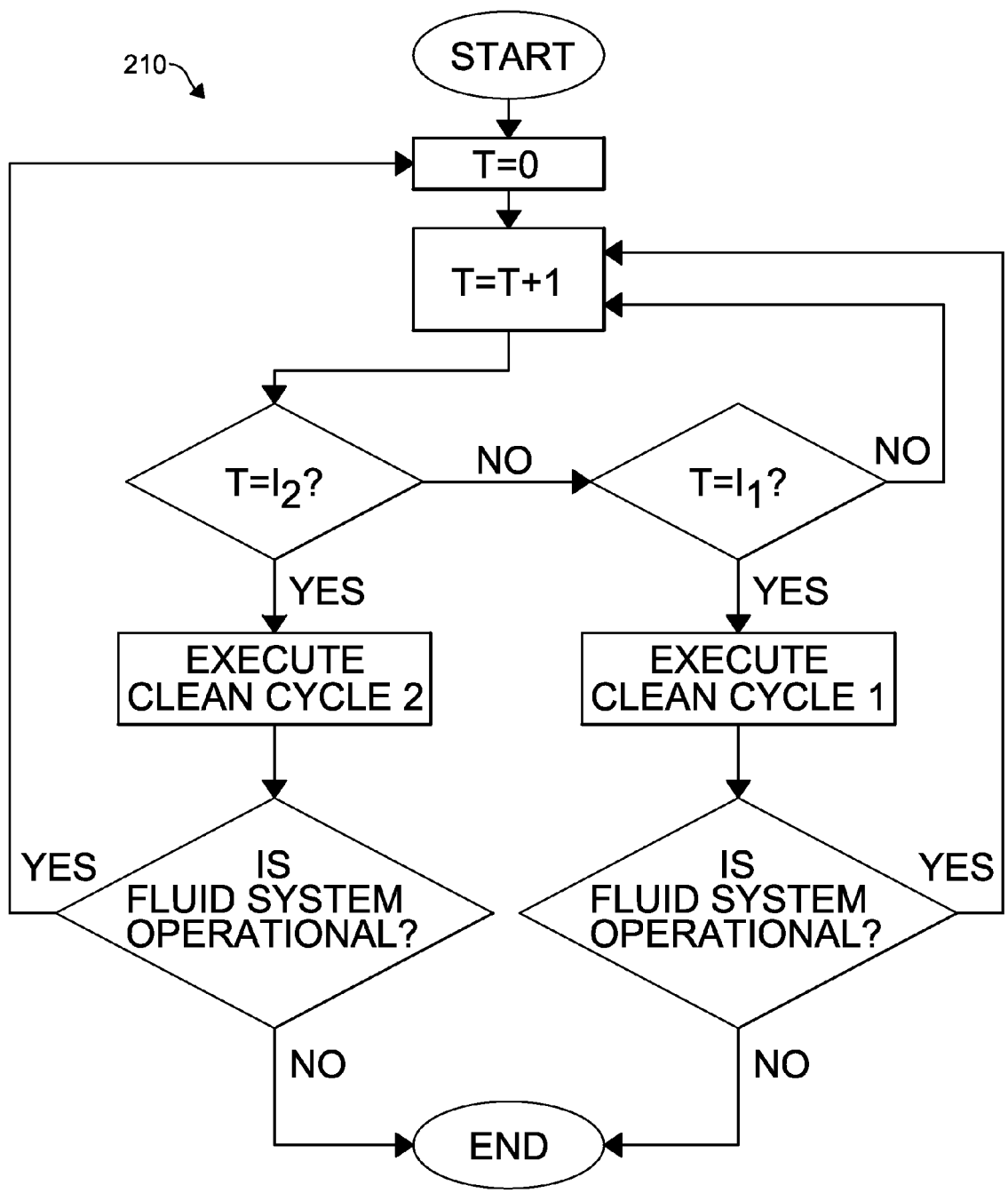
FIG. 12 is a flow chart showing a second embodiment of the improved method according to this invention.

Referring now to FIG. 12, a second embodiment of a method of cleaning a valve is shown at 210. The second embodiment 210 of the method of cleaning a valve is similar to the first embodiment of the method 200 of cleaning a valve, but includes implementing two clean cycles within the same valve.

For example, the sealing portion 31 of the displaceable member 30 of the microvalve 1, or the spool 74 of the hybrid spool valve 118, may be moved at a designated first cycle rate, repeated at a first time interval $I_1$, and also moved at a designated second cycle rate, repeated at a second time interval $I_2$, wherein the second time interval $I_2$ is greater than the first time interval $I_1$. The second embodiment of the method 210 of cleaning a valve may continue as long as the fluid system, such as the refrigeration system 100, within which the microvalve 1 and/or the hybrid spool valve 118 is an operational component, is operational.

As shown in FIG. 12, during operation of the microvalve 1 for example, the time T is measured at designated increments, such as 1 second increments, until the time T equals the time intervals $I_1$ and $I_2$. Because the second time interval $I_2$ is greater than the first time interval $I_1$, at each time increment, the second embodiment of the method 210 of cleaning a valve will determine whether the time T equals the time interval $I_2$. If the time interval $I_2$ has not been reached, the second embodiment of the method 210 of cleaning a valve will then determine whether the time T equals the time interval $I_1$. Upon reaching the time interval $I_1$, the first clean cycle is executed at its predetermined first cycle rate. If the refrigeration system 100 remains operational, the method 210 will return to increment the time counter. If the refrigeration system 100 ceases to operate, the method 210 ends.

After executing the first clean cycle at the end of the time interval $I_1$, the second embodiment of the method 210 of cleaning a valve will continue to measure the time T until the time T equals the time interval $I_2$, whereupon the second clean cycle is executed at its predetermined second cycle rate. If, after completion of the second clean cycle, the refrigeration system 100 remains operational, then the timer count is reset to zero, and the timer starts again. If the refrigeration system 100 ceases to operate, the method 210 ends.

In one example of the second embodiment of the method 210 of cleaning a valve, the first clean cycle may be the same as the first embodiment of the method 200 of cleaning a valve, wherein the sealing portion 31 of the displaceable member 30 of the microvalve 1 is moved at a first cycle rate of twelve clean cycle steps per second at a first time interval $I_1$ of one second every minute. In the second clean cycle, the sealing portion 31 of the displaceable member 30 of the microvalve 1 may be moved at a second cycle rate of five clean cycle steps per second at a second time interval $I_2$ of five seconds every two minutes. The second clean cycle within the second embodiment of the method 210 of cleaning a valve may be more or less rigorous than the first clean cycle as desired, and further causes any micro contaminant particles may be trapped in the critical clearance areas of the openings 4a and 4b to be broken free from the critical clearance areas of the openings 4a and 4b without compromising the overall flow requirement of the refrigeration system 100.

Alternatively, other first cycle rates and other first time intervals $I_1$ may be used. For example, the sealing portion 31 of the displaceable member 30 of the microvalve 1 may be moved at a first cycle rate within the range of about twelve to about twenty-four clean cycle steps per second at a first time interval $I_1$ having any desired duration repeating at any desired time interval. Similarly, other second cycle rates and other second time intervals $I_2$ may be used. For example, the sealing portion 31 of the displaceable member 30 of the microvalve 1 may be moved at a second cycle rate within the range of about one to about five clean cycle steps per second at a second time interval $I_2$ having any desired duration repeating at any desired time interval.

Both the first embodiment of the method 200 of cleaning a valve and the second embodiment of the method 210 of cleaning a valve are intended to prevent clogging in either or both the microvalve 1 and the hybrid spool valve 118. The effect of the either the first or second embodiments of the method 200 and 210 of cleaning a valve, respectively, on the function of the microvalve 1, the hybrid spool valve 118, and on overall superheat control of the hybrid spool valve 118 piloted by the microvalve 1 is preferably negligible. It will be understood that the first and/or second embodiments of the method 200 and 210 of cleaning a valve, respectively, may be applied to any microvalve in any application and are not limited to microvalves functioning as pilot valves in hybrid spool valves in refrigeration systems. The first and/or second embodiments of the method 200 of cleaning a valve and 210, respectively, may also be applied to any spool valve in any application and are not limited to hybrid spool valves in refrigeration systems.

It will be understood that the first embodiment of the method 200 of cleaning a valve may be applied to one or both of the microvalve 1 and the hybrid spool valve 118.

It will be also understood that the second embodiment of the method 210 of cleaning a valve may be applied to one or both of the microvalve 1 and the hybrid spool valve 118.

It will be additionally understood that the first embodiment of the method 200 of cleaning a valve may be applied to one or both of the microvalve 1 and the hybrid spool valve 118 while the second embodiment of the method 210 of cleaning a valve is applied to the one of the microvalve 1 and the hybrid spool valve 118.

Thus, within a fluid system, the first embodiment of the method 200 of cleaning a valve and the second embodiment of the method 210 of cleaning a valve may be implemented independently, together concurrently, together consecutively, or together in any combination of two of the clean cycles in any sequence.

The effect of implementing the second embodiment of the method 210 of cleaning a valve in the microvalve 1 and implementing the first embodiment of the method 200 of cleaning a valve in the hybrid spool valve 118 on overall superheat control of the hybrid spool valve 118 piloted by the microvalve 1 is preferably negligible, other than the improved control afforded by improved operation of the valves which have been cleaned. For example, implementation of the second embodiment of the method 210 of cleaning a valve in the microvalve 1 and implementation of the first embodiment of the method 200 of cleaning a valve in the hybrid spool valve 118 will cause the superheat in the refrigeration system 100 to vary from any desired target superheat, such as the target superheat of 10° F., only within the range of about +/−1.8° F.

Figure 13:
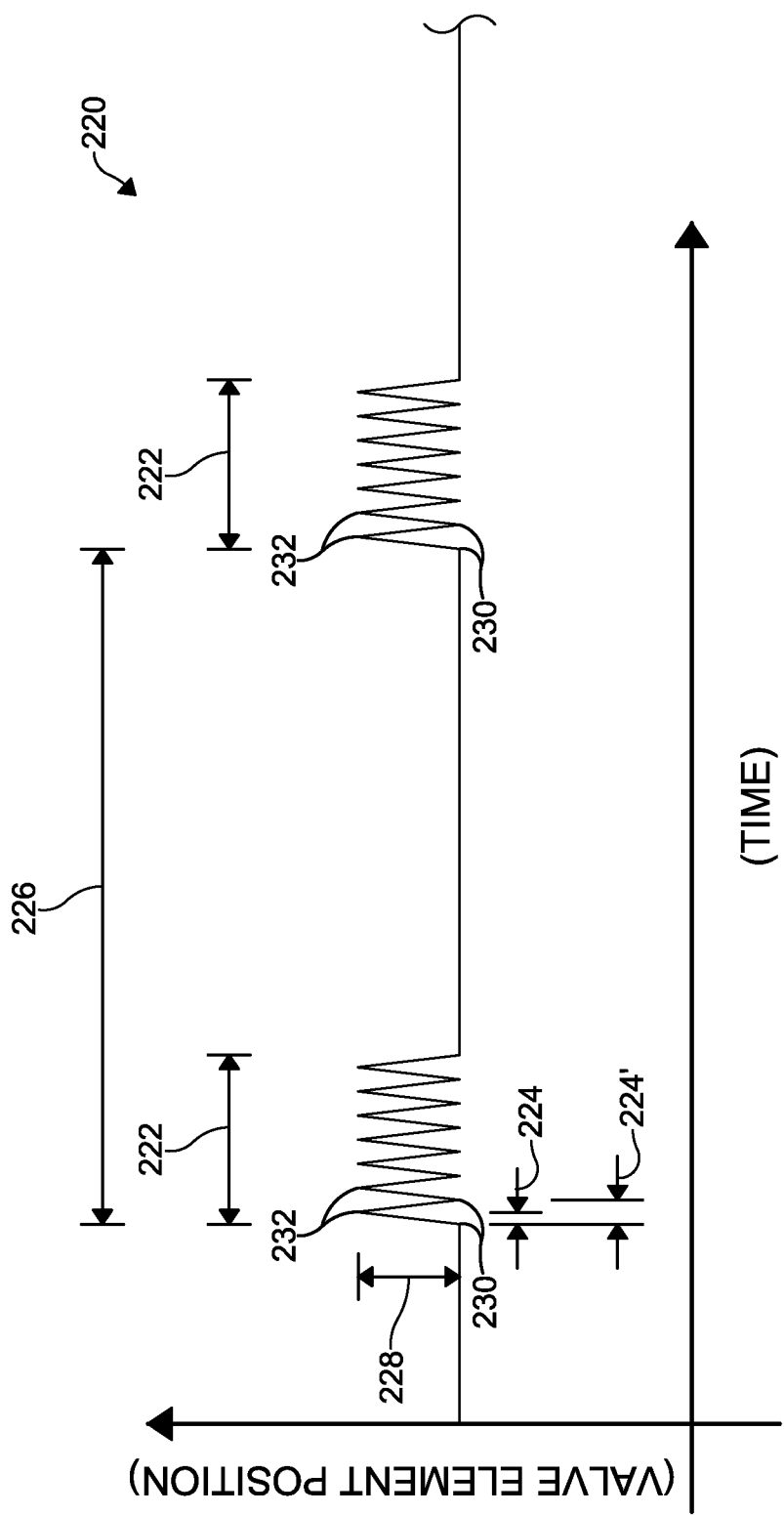
FIG. 13 is a graphic representation of a cleaning regimen according to this invention.

A method of cleaning a valve in accordance with this invention may include any number and combinations of cleaning regimens. As illustrated in FIG. 13, a cleaning regimen 220 is shown as a graph of valve element position over time. The illustrated cleaning regimen 220 includes a clean cycle 222 comprising one or more clean cycle steps 224 and 224'. The clean cycle 222 repeats at a time interval 226. Each of the clean cycle steps 224 and 224' has an amplitude 228 defined as a distance that the valve element moves from the first or start position 230 to the second position 232. It will be understood that the cleaning regimen 220 may be adjusted by adjusting or changing any of the variable components of the cleaning regimen 220, such as for example, the clean cycle 222, the clean cycle steps 224, the interval 226, and the amplitude 228 of the valve element's movement.

While the invention has been discussed with respect to cleaning particulate contaminants from a valve, it is anticipated that the clean cycle procedures described above may also be useful in removing some non-particulate contaminants, and such should be considered within the scope of invention.

It is also anticipated that one or more of the periodicity of performance, or time interval, of a clean cycle, the distance of movement of a flow control valve element between the first position and the second position during the clean cycle step, a speed of movement between the first position and the second position during the clean cycle step, and the number of clean cycle steps performed in a clean cycle may be varied depending upon one or more environmental conditions in an environment within which the fluid system, such as the refrigeration system 100, operates or as otherwise desired. These environmental conditions may, for example, include ambient temperature and pressure, time of year, change of control setting for the fluid system, elapsed time since the fluid system was serviced, equipment run time, a measured level of contaminants flowing through the microvalve 1, the spool valve 118, or the refrigeration system 100, or by a detected accumulation of contaminants in the microvalve 1 or the spool valve 118.

Figure 14:
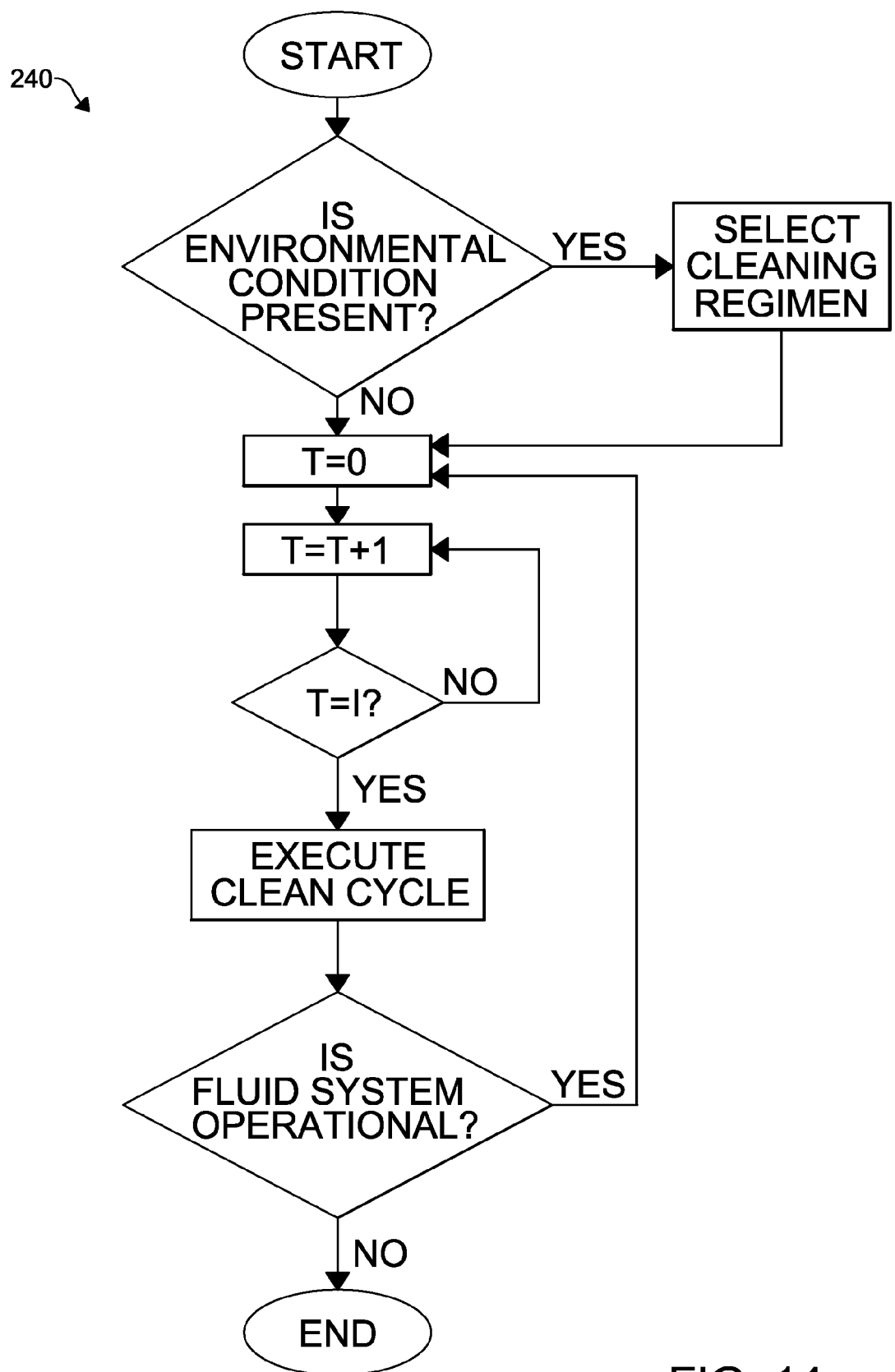
FIG. 14 is a flow chart showing a third embodiment of the improved method according to this invention.

FIG. 14 shows a third embodiment of the method 240 of cleaning a valve. The third embodiment of the method 240 of cleaning a valve is similar to the first embodiment of the method 200 of cleaning a valve, except that the presence of one or more of the environmental conditions in the environment within which the refrigeration system 100 operates, as described above, is sensed or detected by one or more sensors (not shown). If one or more of the environmental conditions is sensed, a cleaning regimen is selected based on the one or more of the sensed environmental conditions. The selected cleaning regimen may adjust any of the variable components of the cleaning regimen 220, such as for example, the clean cycle 222, the clean cycle steps 224, the interval 226, and the amplitude 228 of the valve element's movement.

Figure 15:
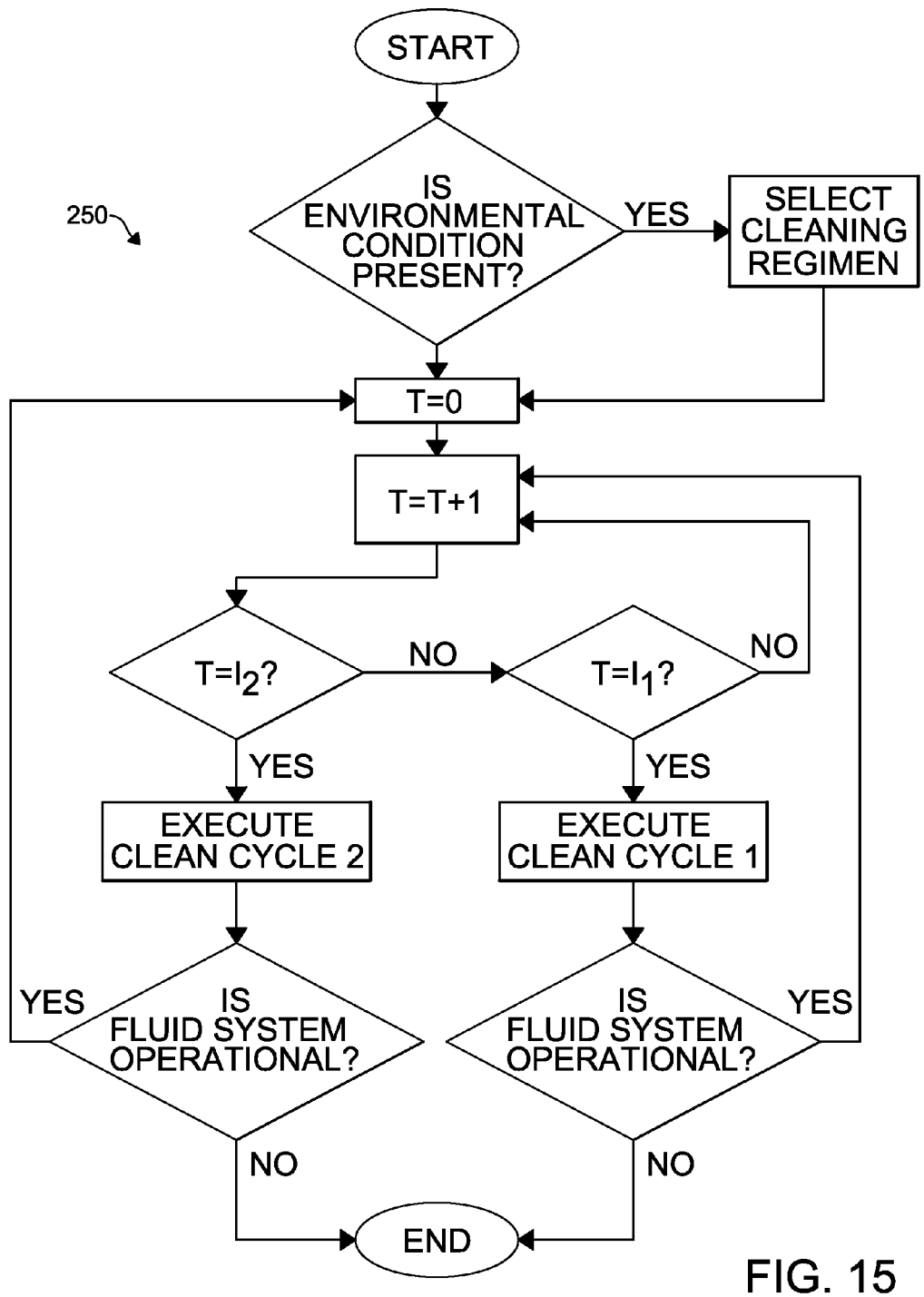
FIG. 15 is a flow chart showing a fourth embodiment of the improved method according to this invention.

FIG. 15 shows a fourth embodiment of the method 250 of cleaning a valve. The fourth embodiment of the method 250 of cleaning a valve is similar to the second embodiment of the method 210 of cleaning a valve, except that the presence of one or more of the environmental conditions in the environment within which the refrigeration system 100 operates, as described above, is sensed or detected by one or more sensors (not shown). If one or more of the environmental conditions is sensed, a cleaning regimen is selected based on the one or more of the sensed environmental conditions. As in the third embodiment of the method 240 of cleaning a valve, the selected cleaning regimen may adjust any of the variable components of the cleaning regimen 220, such as for example, the clean cycle 222, the clean cycle steps 224, the interval 226, and the amplitude 228 of the valve element's movement.

In the embodiments of the method 200, 210, 240, and 250 of cleaning a valve, the designated cycle rate is implemented at a time interval I, $I_1$, or $I_2$. Alternatively, the designated cycle rate may be implemented in response to any change in a condition in the refrigeration system 100 other than a change in superheat. Non-limiting examples of such a change in condition of the refrigeration system 100 include a change of control setting for the refrigeration system 100, elapsed time since the fluid system was serviced, equipment run time, a measured level of contaminants flowing through the microvalve 1, the spool valve 118, or the refrigeration system 100, and by a detected accumulation of contaminants in the microvalve 1 or the spool valve 118.

The principle and mode of operation of the invention have been described in its preferred embodiments. However, it should be noted that the invention described herein may be practiced otherwise than as specifically illustrated and described without departing from its scope.

What is claimed is:

1. A method of cleaning contaminants from a valve in a fluid system comprising:
    operating a valve in an open position wherein a valve flow control element is positioned relative to a fluid port of the valve to allow fluid flow through the fluid port; and
    moving the valve flow control element of the valve through a clean cycle step while the valve is in the open position, the clean cycle step including moving the valve flow control element from a first position to a second position and to one of the first position and a position intermediate the first and the second positions while the valve remains in the open position.

2. The method according to claim 1, wherein the valve is a spool valve.

3. The method according to claim 1, further including repeating the clean cycle step continuously for a pre-determined period of time.

4. The method according to claim 1, wherein one or more clean cycle steps define a clean cycle, wherein the clean cycle may be repeated at a time interval, and wherein the clean cycle is executed at a cycle rate fast enough that fluid flow through the valve is not affected.

5. The method according to claim 1, wherein the step of moving the valve flow control element of the valve through a clean cycle step further includes moving the valve flow control element in response to a change in a condition in the fluid system other than a change in superheat.

6. The method according to claim 5, wherein the change in a condition in the fluid system other than a change in superheat includes a time interval, a change of control setting for the fluid system, elapsed time since the fluid system was serviced, equipment run time, a measured level of contaminants flowing through the valve or the fluid system, and by a detected accumulation of contaminants in the valve.

7. The method according to claim 1, wherein the valve is a microvalve.

8. The method according to claim 7, wherein the microvalve defines a pilot valve in a hybrid spool valve; and
wherein the step of moving the valve flow control element of the valve through the clean cycle step is performed on the microvalve and on the hybrid spool valve.

9. The method according to claim 8, wherein the fluid system is a refrigeration system.

10. A method of cleaning contaminants from a valve in a fluid system comprising:
moving a valve flow control element of the valve through a clean cycle step at first cycle rate;
moving the valve flow control element of the valve through a clean cycle step at second cycle rate different than the first cycle rate;
wherein the clean cycle step includes moving the valve flow control element from a first position to a second position;
wherein the first and second cycle rates are defined as one or more clean cycle steps per a unit of time; and
wherein each clean cycle step is performed without affecting the fluid system during execution of the clean cycle step.

11. The method according to claim 10, wherein the steps of moving the valve flow control element of the valve through a clean cycle step at the first and second cycle rates are performed on a spool valve.

12. The method according to claim 10, wherein each clean cycle step is one of a plurality of clean cycle steps performed during a clean cycle.

13. The method according to claim 12, wherein the step of moving the valve flow control element of the valve through a clean cycle step at the first cycle rate at a first time interval defines a first clean cycle; and
wherein the step of moving the valve flow control element of the valve through a clean cycle step at the second cycle rate at a second time interval defines a second clean cycle.

14. The method according to claim 10, wherein the steps of moving the valve flow control element of the valve through a clean cycle step at the first and second cycle rates are performed on a microvalve.

15. The method according to claim 14, wherein the microvalve defines a pilot valve in a hybrid spool valve; and
wherein the steps of moving the valve flow control element of the valve through a clean cycle step at the first and second cycle rates are performed on the microvalve and on the hybrid spool valve.

16. The method according to claim 15, wherein the fluid system is a refrigeration system.

17. A method of cleaning contaminants from a valve in a fluid system comprising:
moving a valve flow control element of the valve through a clean cycle step;
wherein the clean cycle step includes moving the valve flow control element from a first position to a second position and back to the first position; and
wherein the clean cycle step is performed without affecting the fluid system during execution of the clean cycle step.

18. The method according to claim 17, wherein the valve is a microvalve, and the clean cycle step is one of:
a first clean cycle, which is performed such that the valve flow control element can move through one or more clean cycle steps at a rate fast enough to not affect the fluid system and slow enough to ensure that contaminants do not become clogged in critical clearance areas of the microvalve; and
a second clean cycle, which is performed such that the valve flow control element can move through one or more clean cycle steps at the slowest possible rate wherein the fluid system is not affected.

19. The method according to claim 17, wherein the clean cycle step is part of a periodically performed clean cycle consisting of one or more clean cycle steps;
wherein at least one of a periodicity of performance of the clean cycle, a distance between the first position and the second position during the clean cycle step, a speed of movement between the first position and the second position during the clean cycle step, and a number of clean cycle steps performed in a clean cycle is varied depending upon one or more environmental conditions in an environment within which the fluid system operates.

20. The method according to claim 19, wherein the environmental conditions include ambient temperature and pressure, time of year, change of control setting for the fluid system, elapsed time since the fluid system was serviced, equipment run time, a measured level of contaminants flowing through the valve or the fluid system, or a detected accumulation of contaminants in the valve.

* * * * *